United States Patent [19]

Iniotakis et al.

[11] Patent Number: 4,589,891
[45] Date of Patent: May 20, 1986

[54] HYDROGEN PERMEATIN MEMBRANE, PROCESS FOR ITS MANUFACTURE AND USE

[75] Inventors: Nicolas Iniotakis, Jülich; Claus-Benedict von der Decken, Aachen; Werner Fröhling, Düren, all of Fed. Rep. of Germany

[73] Assignee: Kernforschungsanlage Jülich Gesellschaft mit beschränkter Haftung, Jülich, Fed. Rep. of Germany

[21] Appl. No.: 648,898

[22] Filed: Sep. 10, 1984

[30] Foreign Application Priority Data

Sep. 8, 1983 [DE] Fed. Rep. of Germany ....... 3332346

[51] Int. Cl.$^4$ .............................................. B01D 53/22
[52] U.S. Cl. ....................................... 55/158; 55/524; 55/525; 106/1.28; 420/463
[58] Field of Search ................... 55/16, 158, 524, 525; 106/1.15, 1.28; 420/463

[56] References Cited

U.S. PATENT DOCUMENTS

| | | | |
|---|---|---|---|
| 2,824,620 | 2/1958 | deRosset | 55/16 |
| 2,924,630 | 2/1960 | Fleck et al. | 585/818 |
| 2,958,391 | 11/1960 | deRosset | 55/16 |
| 3,022,187 | 2/1962 | Eyraud et al. | 55/16 X |
| 3,172,742 | 3/1965 | Rubin | 55/158 X |
| 3,238,704 | 3/1966 | Straschil et al. | 55/158 |
| 3,241,298 | 3/1966 | Pierce | 55/16 X |
| 3,244,763 | 4/1966 | Cahn | 55/16 X |
| 3,428,476 | 2/1969 | Langley et al. | 55/16 X |
| 3,447,288 | 6/1969 | Juda et al. | 55/158 |
| 3,469,372 | 9/1969 | Yamauchi et al. | 55/158 |
| 3,534,531 | 10/1970 | Eguchi et al. | 55/158 |
| 3,717,525 | 2/1973 | Bultemann | 55/158 X |
| 3,754,975 | 8/1973 | Spiller | 106/1.28 X |
| 4,391,615 | 7/1983 | Iniotakis | 55/16 |

FOREIGN PATENT DOCUMENTS

| | | |
|---|---|---|
| 2629719 | 1/1978 | Fed. Rep. of Germany . |
| 3121125 | 2/1983 | Fed. Rep. of Germany . |
| 43153 | 11/1978 | Japan .......... 55/16 |
| 127124 | 10/1980 | Japan .......... 55/16 |
| 5691 | of 1911 | United Kingdom .......... 55/16 |
| 1292025 | 10/1972 | United Kingdom . |

OTHER PUBLICATIONS

Driver, R., "Electrodeposition of Palladium on Iron and Steel for Electrochemical Hydrogen Permeation Studies", *J. Electrochem. Soc.: Electrochemical Science and Technology*, Nov. 1981, vol. 128, No. 11, pp. 2367–2369.

*Primary Examiner*—Robert Spitzer
*Attorney, Agent, or Firm*—Nils H. Ljungman

[57] ABSTRACT

A process of manufacturing a hydrogen permeable membrane in which a hydrogen permeable metal is deposited galvanically on a fine mesh metal fabric.

16 Claims, 2 Drawing Figures

HYDROGEN PERMEATIN MEMBRANE, PROCESS FOR ITS MANUFACTURE AND USE

BACKGROUND OF THE INVENTION

1. Field of the Invention

The invention relates to a process for the manufacture of a hydrogen permeation membrane in the form of a thin, selective, hydrogen-permeable metal coating consisting of a material with a high hydrogen permeation coefficient, specifically on the basis of palladium, with an adjacent gaspermeable support structure, and it also comprises a hydrogen permeation membrane and its use.

2. Description of the Prior Art

The high permeability of hydrogen through suitable membranes is used in many ways in industry. The membranes thereby act as a separating wall between two spaces, but one which is hydrogen permeable to the greatest possible extent.

The first example which can be cited is the removal of impurities from hydrogen gas: the hydrogen current to be decontaminated is trained along a separating wall consisting of Pd of Pd-Ag. By permeation, high-purity hydrogen is recovered on the secondary side, while the impurities remain on the primary side. For a high hydrogen-permeation flow—in addition to other operating and material parameters—the wall thickness of the separating membrane must be as low as possible.

Another example is the optionally selective or nonselective separation described in De-OS No. 3 121 125 of certain isotopes of hydrogen, e.g. tritium, from a mixture of isotopes of hydrogen: the hydrogen isotopes permeate a separating membrane, interact with a substance present on the secondary side, and are removed with this latter substance. The choice of the substance makes it possible to either remove all of the hydrogen isotopes or to selectively remove only a given isotope, e.g. tritium.

The separating walls which are used in the processes described above and in similar processes must have a high permeability for hydrogen. Materials which fall into this category include metallic substances such as Nb, Ta, V, Pd and Zr, but also certain glasses and plastics. The prevailing ambient conditions, however, can lead to significant limitations. These limitations, for the metallic substances, include embrittlement from the formation of hydrides and the severe reduction of the hydrogen permeation coefficients as a result of the formation of blocking cover coatings on the surface of the membrane, e.g. in the form of metal oxides. For this reason, preference is given to the use of palladium and its alloys, which are largely resistant both to the formation of hydrides and also to surface oxidation. But with palladium, the principal disadvantages are its high price and its limited availability. For this reason, membranes which are as thin as possible are desirable. On account of the required mechanical stability, the lower limit of the feasible wall thicknesses for thin-walled tubes is about 70 microns, even if reinforcement elements are provided inside, such as spiral springs (DE-PS No. 1 467 079).

To further decrease the wall thickness for the Pd, porous carriers have been suggested, e.g. made of sintered metal, on which a thin Pd coating of up to 12 microns thick is applied, e.g. by vaporization (U.S. Pat. Nos. 2,824,620 and 3,241,298). But with porous carriers which are made of granular material such as metal particles, one disadvantage is their required wall thickness of approximately 500 microns to 1000 microns for the desired strength. This leads to a significant reduction of the effective permeation velocity through the overall separation wall.

While the effective permeation velocity of the hydrogen through a free-standing Pd tube is determined only by the permeation step through the metal, with the combination of a porous carrier 500 microns thick and a Pd coating 5 microns thick, the diffusion velocity in the porous carrier becomes the dominant factor for the effective permeation velocity.

Since the permeation surface required for the achievement of a given permeation flow, and thus the Pd requirement, is determined by these factors, the advantage of the low thickness of the Pd coating can be utilized only very incompletely.

SUMMARY OF THE INVENTION

The problem addressed by the invention is therefore the creation of a hydrogen permeation membrane, which simultaneously possesses sufficient stability and the highest possible permeability for hydrogen.

This problem is solved by a hydrogen permeation wall of the type described above, which is characterized by the fact that for the formation of the thin coating, hydrogen-permeable metal is galvanically deposited on a fine-mesh metal fabric.

For such a hydrogen permeation membrane, the mechanical strength is essentially determined by that of the fine-mesh metal fabric, which on the one hand has a good gas-permeability, but whose mesh is fine enough that a "sagging" of even very thin metal coatings is prevented. The galvanic deposition of the hydrogen-permeable metal coating leads to a stiffening of the fabric, and also offers the possibility of the formation of different types of coatings.

By means of direct application of the coating on the fabric, a "hole closing growth" or "incrust" of the openings or meshes can be achieved, in which very low coating thicknesses remain in the thin central regions, facilitating the passage of hydrogen.

BRIEF DESCRIPTION OF THE DRAWING

The accompanying drawing.

DESCRIPTION OF A PREFERRED EMBODIMENT

A thin metal coating is formed of palladium or palladium/silver, or another palladium alloy, which has a high permeability, has a thickness which corresponds to at least approximately half the mesh width—depending on the mesh width of the metal fabric selected—in the neighborhood of 1 to 20 microns, especially 2 to 10 microns. Naturally the build-up of greater coating thicknesses is undesirable, so that, to harmonize the mesh-widths of commercially available metal cloth, coatings of up to about 15 microns should be considered.

Figure 1:
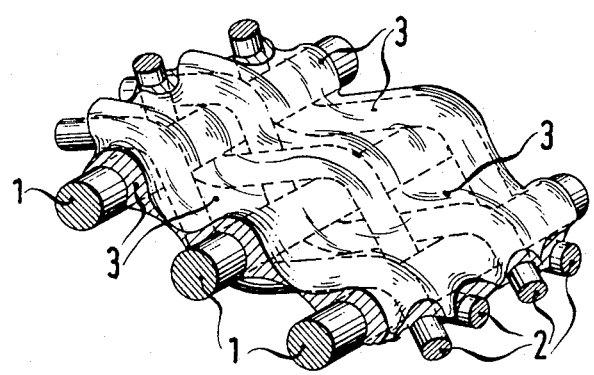
FIG. 1, shows in schematic form a hydrogen permeation membrane in accordance with the invention, created by one-side deposition of metal; a section of which is outlined in FIG. 2.
Figure 2:
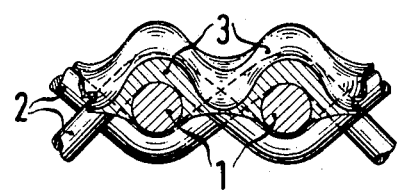

Referring to FIG. 1, the warp threads 1 of the metal fabric have a thickness of, for example, 50 to 80 microns, and the woof threads 2 of 20 to 50 microns. The galvanically deposited metal coating is schematically illustrated by lines 3.

During the galvanic deposition which could be achieved from one side only or from both sides of the metal fabric, not only can coatings of one metal be produced, but also coatings of several metals, specifically alloy coatings, by depositing two or even more metals simultaneously in the form of an alloy, or one after another in sequential coatings which, if necessary, can be converted into the desired alloy by means of a final tempering.

While by means of direct galvanic coating of metal fabrics, coatings can be formed by a hole closing growth at the openings of meshes, with the formation of roughened surfaces, whereby the minimum possible coating thickness of the selective hydrogen-permeable metal coating is a function of the mesh width which must be spanned by the deposited coating, according to a variant of the process, by means of a preliminary filling of the grid spaces with an electrically conductive material which can be removed if necessary, such as conducting silver paint, which is deposited from a colloidal solution, a situation can be created in which the galvanic deposition takes place practically uniformly over the entire surface.

Such a deposit from a colloidal solution spanning the mesh openings can be done especially with a metal which is a desired alloy component of the permeation coating to be formed, such as, for example, silver for the formation of a palladium/silver coating. In this case, too, the formation of the alloy is accomplished by a final tempering.

But the preliminary coating formed from a colloidal solution can also be removed after the galvanic formation of the desired permeation coating.

The galvanic production of the selective hydrogen-permeable coating can, in addition to providing a mechanical reinforcement of the wall and a relatively thin profile for the permeation coating, also be used to refine a metal fabric which is itself base and protect it against corrosion. At the same time, by a roughening of the surface, and even of the metal fabric, an influence can be exerted on other components of the gas which contains the hydrogen, by processes such as adsorption or absorption.

The relatively thin permeation coating formed by galvanic deposit should preferably be protected from the effects of impurities and mechanical stresses by the application of another metal fabric on its surface. By means of such an additional covering of the galvanic coating, which therefore practically lies between two pieces of metal fabric, an improvement of the handling properties is achieved since, for example, weld seams are possible on overlaps (which are now formed by four layers of metal fabric, as well as two galvanically deposited coatings), which otherwise would not be so easy to execute on account of the very low coating thickness.

An increased spatial concentration of the permeation surface can be achieved by corrugation, so that more membrane surface is present per unit of volume for the hydrogen permation. In addition, the corrugation produces an increase in the mechanical stability of the permeation wall. If necessary, an additional heavy support frame can be provided, which can also be designed as a positive displacement body.

For the use of the present permeation wall as a selective tritium filter for the process described by DE-OS 3 121 125, according to which tritium, for example, is removed from a reactor cooling circuit operating with helium by permeation through a hydrogen-permeable membrane and reaction behind the membrane with a hydrogen-absorbing material, the invention offers the following advantages:

The hydrogen-permeable coating is protected on both sides by the metal fabric, including protection from the passivating fission products—e.g. iodine—which are contained in the primary gas, since the surface of the metal fabric can act as an adsorber.

While the foregoing describes and illustrates certain present preferred embodiments of the invention, it is to be understood that the invention is not limited thereto and that the invention may be otherwise variously practiced within the scope of the following claims.

We claim:

1. A process for the manufacture of a hydrogen permeable membrane in the form of a thin hydrogen-permeable metal coating of a material with a high hydrogen-permeation coefficient on a fabric of fine metal mesh, said process comprising galvanic deposition of a hydrogen-permeable metal having a high hydrogen-permeation coefficient on to a fine mesh metal fabric, said metal coating having a thickness range of about 1 to 20 microns, said fine mesh metal fabric having a mesh width of about 40 microns at the most.

2. A process according to claim 1 in which at least two metals are deposited on the fabric.

3. A process according to claim 2 in which a metal coating is laid down on the metal fabric prior to said galvanic deposition.

4. A process according to claim 3 in which a metal coating is laid down from a colloidal solution and is later removed at least in part after galvanic deposition.

5. A process according to claim 2 in which a galvanically-coated metal fabric is tempered.

6. A process according to claim 1 in which the hydrogen-permeable metal is galvanically deposited in a thickness which corresponds to at least approximately half the width of the mesh.

7. A process according to claim 6 in which a second metal fabric is applied on the galvanic coating.

8. A process for the manufacture of a hydrogen permeable membrane as in claim 1, wherein said metal coating has a thickness range of about 2 to 10 microns.

9. A process for the manufacture of a hydrogen permeable membrane as in claim 1, wherein said metal coating has a thickness of up to 15 microns.

10. A hydrogen permeable membrane comprising a metal fabric with a hydrogen-permeable metal coating galvanically deposited on and adhering to said metal fabric, wherein said metal fabric has a mesh width of about 40 microns at the most, and wherein said metal coating has a thickness range of about 1 to 20 microns.

11. A hydrogen permeation membrane according to claim 10 in which a second metal fabric is positioned over the hydrogen-permeable metal coating.

12. A permeation membrane according to claim 11, said membrane being supported by an additional support structure.

13. A permeation membrane according to claim 12, wherein said membrane inclusive of and additional support structure is corrugated.

14. A permeation membrane according to claim 11, wherein said membrane inclusive of said metal fabrics is corrugated.

15. A hydrogen permeable membrane according to claim 10 wherein said metal coating has a thickness range of about 2 to 10 microns.

16. A hydrogen permeable membrane according to claim 10 wherein said metal coating has a thickness of up to 15 microns.

* * * * *

UNITED STATES PATENT AND TRADEMARK OFFICE
CERTIFICATE OF CORRECTION

PATENT NO. : 4,589,891
DATED : May 20, 1986
INVENTOR(S) : Iniotakis, et al

It is certified that error appears in the above-identified patent and that said Letters Patent is hereby corrected as shown below:

In the Title:

Cover page, Item (54) change "PERMEATIN" to --PERMEATION--
Column 1, change "PERMEATIN" to --PERMEATION--.

Signed and Sealed this

Fourteenth Day of April, 1987

Attest:

DONALD J. QUIGG

Attesting Officer

Commissioner of Patents and Trademarks